Patented July 10, 1951

2,559,608

UNITED STATES PATENT OFFICE 2,559,608

MULTICOLOR CARBON PAPER

Joseph R. Ehrlich, New York, N. Y.

No Drawing. Application November 26, 1948,
Serial No. 62,241

5 Claims. (Cl. 282—28)

My invention refers to a coated paper useful for the reproduction by imprint, impression or impact, of written or typed texts, markings or drawings, of the kind commonly called "carbon paper." A sheet of such paper is inserted between the sheet receiving the original writing, typing or drawing and another sheet receiving the copy thereof, the coating of the "carbon paper" facing the latter. In the following, the term "carbon paper" shall be applied to a coated paper of this kind no matter whether its coating contains carbon black as a pigment or any other coloring matter; the term "ink" shall be used to denote the coating composition.

It is frequently desirable to distinguish certain words, phrases or numerals by a different color. For example, it is customary to make bookkeeping entries in black and red colors, signifying credit and debit items, as the case may be. This need has been recognized by supplying typewriters with the well-known black and red ribbons and a mechanism by which either black or red typing can be applied to the original. However, this device is unable to transmit the color distinction to the carbon copies which are always black or in any other uniform color; hence, the copies are not entirely identical with the original and fail to reproduce certain important aspects thereof. This deficiency is so serious that special typewriters are made which have two sets of numerals, one in normal and the other in cursive script. By this means distinctions are transmitted to the copies but they are not as conspicuous as contrasting colors and it is impossible to duplicate all characters on a typewriter in this manner.

It is an object of my invention to provide a carbon paper which when used in the conventional way permits the making of copies in two or more colors and it is another object to obtain this result by a simple treatment which can be executed without special skill. As a further object, the color variability is to reside completely in the ink of the carbon paper so that its imprint on any kind of available copy paper may be made to change its color.

Conventional carbon paper ink is a mixture of oils, fats, waxes and/or resins serving as a vehicle for finely divided insoluble pigments and/or soluble dyestuffs. Thus, a black carbon paper usually contains carbon black and a black dyestuff such as, e. g., a fat-soluble nigrosin base and other dyestuffs to neutralize eventual "undertones" and thus to produce a pure, opaque black. The same principle is applied in carbon papers of other colors, i. e., pigments and dyes of the same basic color are used in combination.

According to my invention, I incorporate into the coating vehicle a pigment having one basic color with the exception of black, and a dyestuff or combination of dyestuffs having another basic color, different from the first; the dyestuff or combination of dyestuffs being present in sufficient quantity either to produce, together with the pigment, a substantially different ink color or to impose its own color by completely hiding, covering and suppressing that of the pigment. The pigment must be insoluble, and the dyestuffs must be soluble in the vehicle. The dyestuff or dyestuffs so employed must be susceptible to the action of chemical agents capable of either destroying their tinctorial power or of changing their basic color, whereas the pigment employed must be inert towards the same chemical agents and its color must not be affected thereby. In consequence, the chemical treatment of the copy makes the color of the pigment appear, either dominant or modified by the changed color of the dyestuff, causing the treated passage to assume a contrasting color.

Depending on the type of dyestuff or dyestuffs present, the said chemical agents may be oxydizing or reducing agents, pH controlling agents and others.

For example, if an inert red color lake is used as the pigment in combination with a fat-soluble organic black dyestuff or a neutral black mixture of fat-soluble purple, green and yellow dyestuffs in such proportion that the combination of red pigment and black dye appears black, a carbon paper is obtained which resembles ordinary black carbon paper and yields black copies. However, black copies so made can be turned into red immediately upon contact with a strong oxidizing agent. For example, if it is desired to make certain words or numbers appear in red it merely is necessary to touch them with one of the commercial chemical ink erasers such, for example, of aqueous solutions of sodium hypochlorite or of potassium permanganate followed by oxalic acid, or of other oxidizing agents.

In order to prepare a carbon paper capable of yielding copies in three different colors it is necessary to use a combination of an inert pigment and a dyestuff mixture wherein, for example, one dyestuff can be bleached by a reducing agent while other dyestuffs present are not affected thereby but wherein all dyestuffs can be destroyed by oxidation. Thus, an inert red pigment in combination with a mixture consisting of Victoria blue base and malachite green (and supplementary dyes to make a neutral black), upon treatment with a strong reducing agent such as an aqueous solution of sodium hydrosulfite, Rongalite or ammonium sulfide, turns from black into purple because the malachite green is reduced to its colorless leucobase, leaving the red pigment with the Victoria blue; but only the red pigment of the combination will prevail if all dyestuffs are oxidized. Hence, the originally black can be changed at will into either purple or red.

The conventional vehicles for the coloring matters in carbon papers are mixtures of oils, fats, waxes, resins and other materials which are mostly water-insoluble and even water-repellant. Most of the chemical reactions useful to effect the color changes on which my invention is based proceed only in the aqueous solution or at least require the presence of water. For this reason and in order to apply my invention to best advantage, acting rapidly and yielding even results particularly if the copy is rather heavy, I employ vehicles which contain or which consist entirely of hydrophilic substances. The latter are not necessarily water-soluble but capable of absorbing and retaining a certain amount of water if in contact therewith and thus assure rapid, complete and uniform action by the chemical agents used to produce the color changes.

The pigments used according to my invention may have any chemical composition, the only limiting attributes being insolubility in the vehicle and their resistance to the chemical agents employed. The pigments may be inorganic substances such as milori blue (a special kind of Prussian blue used in printing inks), vermillion, cadmium red, chrome green, chrome yellow, ferric oxides, tungstan colors, etc., or they may be color lakes such as, e. g., Lithol reds, "Red Lake C."

Dyestuffs of any chemical composition and structure can be used, subject to the requirements of solubility in the vehicle and respective resistance or susceptibility to the chemical agents employed to bring about the desired color conversion in the copy. The effects of these various agents on the dyestuffs is well known to the art and they require no experimentation for the purpose of my invention.

Numerous combinations of substances of fat, oil, wax and resin character can be used to produce the vehicle which must possess the physical properties suitable for application to the paper in a thin, adherent and non-soiling layer by known methods and which must be serviceable by all standards demanded of a carbon paper in its various uses. However, for the best embodiment of my invention it is advantageous that the vehicle have the additional quality, not required in the conventional carbon papers, of admitting aqueous reagents. If the vehicle itself is not sufficiently water-absorptive adequate amounts of hydrophilic ingredients must be added to it.

Among ingredients of hydrophilic character may be mentioned, esters of polyhydric alcohols and ether-alcohols, such as the series of ether glycols known in the trade as di- to dodeca ethylene glycols, with long-chain fatty acid such as lauric, stearic, myristic, oleic, linoleic or ricinoleic acid; ammonium, amine salts of the same acids; alkyl amines containing between 8 and 22 carbon atoms and their salts; "water-soluble waxes" such as polyethylene glycols (polyethylene oxides) of molecular weights above 500; esters of hexitol anhydrides and their polyoxy-alkylene derivatives.

In some substances useful as vehicle ingredients, such as diethylene glycol mono stearate or glyceryl mono myristat, the hydrophilic character can sufficiently be enhanced by the addition of small amounts of soaps.

*Example 1*

The following materials are intimately mixed:

29 parts per weight carnauba wax
7 parts per weight lanolin
4 parts per weight crown wax 500 (micro-crystalline wax M. P. 67° C.)
26 parts per weight petrolatum
14 parts per weight vegetable oil
5 parts per weight cyclized rubber
14 parts per weight Red lake C
1.5 parts per weight malachite green base
4.0 parts per weight Victoria blue base
1.5 parts per weight oil yellow BB (Ciba Co. Inc. N. Y.)

The black ink thus obtained is coated on paper by one of the usual methods. Upon touching the black carbon copy with an aqueous solution of sodium hypochlorite, about 2% strength, blotting and subsequent touching with dilute hydrochloric acid, the color of the copy changes gradually from black to a permanent red.

*Example 2*

33 parts carnauba wax
10 parts oleic acid
10 parts lanolin
10 parts stearic acid
22 parts Red lake C
4 parts methyl violet base
3.5 parts malachite green base
2.5 parts oil yellow are intimately mixed as in Example 1. The black copy changes to red upon treatment with a 5% potassium permanganate solution followed by an aqueous 10% oxalic acid solution.

*Example 3*

28 parts propylene glycol mono stearate
31 parts carnauba wax
15 parts diglycol oleate (di ethylene glycol oleate)
16 parts Red lake C
3.5 parts methyl violet base
1.— parts Victoria blue base
3.5 parts malachite green base
2.— parts oil yellow The black copy immediately turns into a brilliant red upon contact with a sodium hypochlorite solution specified in Example 1. However, if instead, the copy is treated with an aqueous 2% ammonium sulfide solution, its color is changed to violet. The latter can be turned into red by subsequently applying the above sodium hypochlorite solution.

*Example 4*

27 parts di glycol stearate (containing 4% castile soap)
35 parts carbo wax 6000 (polyethylene glycol, avge MW 6000)
12 parts diethylene glycol oleate
14 parts Red lake
12 parts nigrosin base, oil-soluble The copy produced with this ink turns rapidly from black to red by means of the sodium hypochlorite solution used in Example 1.

Example 5

28 parts propylene glycol mono stearate
31 parts carnauba wax
15 parts diglycol oleate
15 parts chrome green (mixture of Prussian blue and chrome yellow)
11 parts crystal violet base Upon touching with dilute hydrochloric acid of about ¼ N strength, the color of the copy is changed from violet to green.

Example 6

25 parts ammonium stearate
34 parts carnauba wax
15 parts diethylene glycol oleate
5 parts castor oil
16 parts Red lake C
5 parts crystal violet base, oil soluble.

Sodium hypochlorite solution (see Example 1) turns the copy from purple to red.

All quantities indicated in the above examples are in parts by weight.

It will be understood that, without departure from the spirit of the invention or the scope of the claims, various modifications may be made in the specific expedients described. The latter are illustrative only and not offered in a restrictive sense, it being desired that only such limitations shall be placed thereon as may be required by the state of the prior art.

I claim:

1. A carbon paper coated with an ink comprising (a) at least one organic dyestuff, (b) a water-insoluble pigment, and (c) a vehicle wherein the said dyestuff and the said pigment are uniformly dispersed; said dyestuff and said pigment having different and contrasting respective colors, and said dyestuff being present in quantity sufficient to cause its own color to predominate over the contrasting color of said pigment and to determine the apparent marking color of said ink; and said dyestuff being reactive with a selected aqueous reactant, said reactant changing the state of oxidation of said dyestuff and thereby causing its color to change, and said pigment being resistant to said reactant; and said vehicle being insoluble in water but penetrable by water.

2. A carbon paper as claimed in claim 1, wherein the said dyestuff is reactive with an aqueous solution of an oxidizing agent selected from the group consisting of the alkali salts of hypochlorous acid and permanganic acid.

3. A carbon paper as claimed in claim 1, wherein the said dyestuff is reactive with an aqueous solution of a reducing agent selected from the group consisting of sodium hydrosulfite, formaldehyde sulfoxylate and ammonium sulfide.

4. A carbon paper as claimed in claim 1, comprising a mixture of organic dyestuffs of different and contrasting respective colors and a water-insoluble pigment of a further color different and contrasting from the respective colors of said dyestuffs; at least one of said dyestuffs being reactive with an aqueous solution of a reducing agent selected from the group consisting of sodium hydrosulfite, formaldehyde sulfoxylate and ammonium sulfide, and at least one other of said dyestuffs being reactive with an aqueous solution of an oxidizing agent selected from the group consisting of the alkali salts of hypochlorous acid and permanganic acid, and said pigment being resistant to said reducing agent and to said oxidizing agent; selective application of said aqueous agents causing the original marking color of said ink to change to either one of two colors, said two colors being different and contrasting from said original marking color.

5. A carbon paper as claimed in claim 1, wherein the apparent marking color of the ink is black and wherein the color of said pigment is red.

JOSEPH R. EHRLICH.

REFERENCES CITED

The following references are of record in the file of this patent:

UNITED STATES PATENTS

| Number | Name | Date |
|---|---|---|
| 376,764 | Wortman | Jan. 24, 1888 |
| 1,524,874 | Marston | Feb. 3, 1925 |
| 2,357,948 | Gessler | Sept. 12, 1944 |

FOREIGN PATENTS

| Number | Country | Date |
|---|---|---|
| 535,037 | Great Britain | Mar. 26, 1941 |
| 550,332 | Great Britain | Jan. 4, 1943 |